United States Patent [19]
Tokutake et al.

[11] Patent Number: 5,939,186
[45] Date of Patent: Aug. 17, 1999

[54] MAGNETIC HEAD

[75] Inventors: Fusashige Tokutake; Junichi Honda; Yoshihiko Inoue, all of Miyagi, Japan

[73] Assignee: Sony Corporation, Tokyo, Japan

[21] Appl. No.: 08/789,873

[22] Filed: Jan. 28, 1997

[30] Foreign Application Priority Data

Jan. 29, 1996 [JP] Japan .................................. 8-012956
Nov. 20, 1996 [JP] Japan .................................. 8-309699

[51] Int. Cl.$^6$ ...................................................... G11B 5/66
[52] U.S. Cl. ........................ 428/332; 428/336; 428/611;
428/622; 428/629; 428/632; 428/638; 428/670;
428/672; 428/673; 428/678; 428/692; 428/694 R;
428/694 TR; 428/694 T; 428/694 TS; 428/694 TM;
428/900; 360/113; 324/252
[58] Field of Search ..................................... 428/611, 622,
428/629, 632, 639, 670, 672, 673, 678,
694 R, 694 TR, 694 T, 694 TS, 694 TM,
692, 332, 900, 336; 360/113; 324/252

[56] References Cited

U.S. PATENT DOCUMENTS

| 5,210,668 | 5/1993 | Sillen et al. | 360/120 |
| 5,262,915 | 11/1993 | Terunuma et al. | 360/120 |
| 5,549,978 | 8/1996 | Iwasaki | 428/692 |

FOREIGN PATENT DOCUMENTS

| 0-174-144 A2 | 3/1986 | European Pat. Off. . |
| 0-380-136 A2 | 8/1990 | European Pat. Off. . |
| 0380136A3 | 8/1990 | European Pat. Off. . |
| 0-620-571 A2 | 10/1994 | European Pat. Off. . |
| 0637014A2 | 2/1995 | European Pat. Off. . |

OTHER PUBLICATIONS

Qiu, G., et al., The effect of Film Geometry on the Properties of Fetan Films, Journal of Applied Physics, vol. 75, No. 10, Part 02B, May 15, 1994, pp. 6934–6936, XP000458263.

*Primary Examiner*—Leszek Kiliman
*Attorney, Agent, or Firm*—Hill & Simpson

[57] ABSTRACT

A magnetic head having a laminated magnetic film in which crystal orientation of precipitated small crystal particles can be controlled and the soft magnetic characteristic in the thickness of the laminated magnetic film can easily be controlled. The magnetic head has the laminated magnetic film formed by laminating thin magnetic layers, each having a composition as $Fe_xM_yN_z$, and metal layers. The laminated magnetic film is subjected to heat treatment so that metal atoms forming the metal layers are diffused into the thin magnetic films. Thus, the laminated magnetic film contains small crystal particles of αFe, the direction of crystal of which is controlled by the diffused metal atoms. Therefore, the laminated magnetic film has an excellent soft magnetic characteristic also in the direction of the thickness thereof.

8 Claims, 11 Drawing Sheets

MAGNETIC HEAD

BACKGROUND OF THE INVENTION

1. Field of the Invention

The present invention relates to a laminated magnetic film, such as a so-called precipitation-type microcrystal soft-magnetic thin film, a method of manufacturing the laminated magnetic film and a magnetic head having the laminated magnetic film.

2. Description of the Related Art

In recent years, recording densities of signals have been raised in the magnetic recording field, thus resulting in that magnetic recording mediums, such as metal tapes, having great coercive force and high residual magnetic flux densities have been employed, the metal tape being manufactured by directly coating a non-magnetic support member with a ferromagnetic metal material. Under the circumstances, magnetic heads have been required to comprise a core made of a material having a high saturated magnetic flux density and high magnetic permeability.

To meet the foregoing requirement, a metal-in-gap type magnetic head (hereinafter called a MIG head) has been suggested which is structured such that ferrite is employed as a sub-core material and a metal magnetic film having a high saturated magnetic flux density is, as a main core material, formed on the ferrite layer so that a magnetic gap portion is formed by the metal magnetic film. The metal-in-gap type magnetic head is capable of satisfactorily recording and reproducing signals to and from a metal tape.

Under the circumstances in which the recording density has been raised considerably, the magnetic head of the above-mentioned type must be composed of a metal magnetic material having a high saturated magnetic flux density, with which a large recording magnetic field can be obtained, and exhibiting a soft magnetic characteristic in order to record and reproduce signals to and from a magnetic recording medium, such as the metal tape, having great coercive force.

Since a so-called precipitation type and microcrystal metal magnetic film containing Fe as the main component thereof has a high saturated magnetic flux density and excellent soft magnetic characteristic in the in-plane direction, the foregoing film has been put into practical use in place of the conventional metal magnetic material for making a magnetic head.

The precipitation-type microcrystal metal magnetic film is generally formed such that a non-crystalline film is formed; and then the film is subjected to heat treatment so that small crystal particles mainly composed of Fe are dispersed and precipitated. The precipitation-type microcrystal metal magnetic film is exemplified by Fe—Ta—N. The precipitation-type microcrystal metal magnetic film in the form of Fe—Ta—N has a high magnetic permeability equal to that of a soft magnetic amorphous film and a high saturated magnetic flux density equal to that of Fe. Therefore, it can be said that the precipitation-type microcrystal metal magnetic film is a metal magnetic material suitable to manufacture the above-mentioned magnetic head.

However, the precipitation-type microcrystal metal magnetic film involves crystal particles being dispersed and precipitated therein after it has been subjected to heat treatment. However, the precipitation-type microcrystal metal magnetic film encounters a difficulty in controlling the crystal orientation of microcrystal particles. That is, the precipitation-type microcrystal metal magnetic film involves precipitated microcrystal particles having a random crystalline orientation.

Therefore, if the precipitation-type microcrystal metal magnetic film is employed as the metal magnetic material for manufacturing a magnetic head, the soft magnetic characteristic in the direction of the thickness thereof is unsatisfactory despite excellent in-plane soft magnetic characteristic. Therefore, even if a magnetic head is manufactured by using the above-mentioned precipitation-type microcrystal metal magnetic film, the efficiency of the magnetic head is unsatisfactory, and a required improvement in reproduction output cannot be realized.

SUMMARY OF THE INVENTION

Accordingly, an object of the present invention is to provide a magnetic head using a laminated magnetic film in which the crystalline direction of the precipitated microcrystal particles is controlled and which has a controlled soft magnetic characteristic in the direction of the thickness thereof and thus having a significantly improved reproduction output.

In order to achieve the foregoing object, the inventors of the present invention have performed investigations, thus resulting in a fact being found that a contrivance in which a metal layer is laminated on a thin magnetic layer and then the thin magnetic layer and the metal layer are subjected to heat treatment causes metal atoms forming the metal layer to be dispersed into the thin magnetic layer so that the direction of the crystalline orientation of the microcrystal particles which are dispersed and precipitated in the thin magnetic layer is controlled.

According to one aspect of the present invention, there is provided a magnetic head comprising a pair of half portions forming a magnetic core and arranged to be joined and integrated with each other such that surfaces of the pair of the half portions, on which a magnetic gap is formed, are abutted against each other; and a metal magnetic film formed on the surface of at least either of the pair of the half portions for forming the magnetic core on which the magnetic gap is formed, wherein the metal magnetic film is a laminated magnetic film formed by laminating thin magnetic layers and metal layers, each of the thin magnetic layers having a composition expressed as $Fe_xM_yN_z$, where M is at least any one of Ta, Zr, Hf, Nb, Ti, Mo and W, and x, y and z each indicates atom percent and holds relationship as $71 \leq x \leq 85$, $6 \leq y \leq 15$ and $9 \leq z \, V \, 16$.

The magnetic head according to the present invention having the above-mentioned structure has the laminated magnetic film as the metal magnetic film. Therefore, the crystal direction in the metal magnetic film of the above-mentioned magnetic head is controlled and, therefore, the soft magnetic characteristic of the metal magnetic film in the direction of the thickness thereof can be improved.

The magnetic head may have such a structure that each of the metal layers is formed on each of the thin magnetic layers.

The metal layers according to the present invention may be formed above or below the magnetic metal layer if the metal layers can be diffused into the metal magnetic layer attributable to the heat treatment and the metal layers are able to control the crystal orientation of small crystal particles which are dispersed and precipitated in the metal magnetic layer. The metal layers attain a similar effect because of a similar operation regardless of the positions of the metal layers whether the metal layers are laminated on the metal magnetic layer or below the same.

The magnetic head is required to have such a structure that one element is selected from a group consisting of Rh, Ir, Ag, Pt, Pd and Au to form the metal layers. It is preferable that the metal layers are Pt layers.

It is preferable that the magnetic head have such a structure that the metal layers have an average thickness of 0.2 nm to 10 nm for one layer in order to obtain a satisfactory diffusion effect of the metal layers for forming the metal magnetic film.

If the average thickness of one metal layer is smaller than 0.2 nm, a satisfactory diffusion effect cannot be obtained. If it is larger than 10 nm, the excessively large thickness having a shape effect results in the metal layers acting as false gaps. In this case, swell is generated in the reproduced output characteristic.

The metal layers and the thin magnetic layers are formed by a vacuum method for forming a thin film, such as a vacuum evaporation method, a sputtering method or an ion plating method. If the thickness of the plurality layer formed by, for example, sputtering, is 0.2 nm, it can be considered that the metal layer is not formed into a state of a simple thin film but it is in a state in which particles are dotted like islands. Therefore, the thickness of the metal layer is expressed with the average thickness for each layer.

It is preferable that the magnetic head according to the present invention has the thin magnetic films forming the metal magnetic film having a thickness of 0.05 $\mu$m to 1 $\mu$m for one layer in order to cause the thin magnetic layers forming the metal magnetic film to be satisfactory affected by the diffusion effect of the metal layers.

If the thickness of the thin magnetic films is smaller than 0.05 $\mu$m, the number of film forming processes, such as sputtering, for forming the thin magnetic films increases and therefore the productivity deteriorates. What is worse, the number of the metal layers increases, thus causing the effective saturated magnetic flux density to be lowered. If the thickness of the thin magnetic films is larger than 1 $\mu$m, the diffusion effect of the metal layers deteriorates.

It is preferable that the magnetic head according to the present invention has such a structure that the total thickness of the metal layers is not more than 6% of the overall thickness of the metal magnetic film.

When the above-mentioned thin Fe—M—N magnetic layer is formed, annealing is performed after the thin Fe—M—N magnetic layer has been formed. At this time, Fe—metal compounds are generated. Since the Fe—metal compounds are positive magnetostrictive hard magnetic materials, increase in the Fe-metal compounds in the metal magnetic film results in the coercive force of the metal magnetic film to be enlarged unsatisfactorily and the magnetostriction of the metal magnetic film to be unintentionally considerably shifted to the positive values. To restrict the quantity of the Fe-metal compounds so as to prevent abovementioned phenomena, it is preferable that the total thickness of the metal layers is not more than 6% of the overall thickness of the metal magnetic film, more preferably not more than 3%.

It is preferable that the magnetic head according to the present invention has such a structure that the metal layers are not more than 5 wt % of the thin magnetic layers in order to restrict the quantity of the Fe-metal compounds so as to prevent the above-mentioned phenomena.

It is preferable that the magnetic head according to the present invention has such a structure that the half portions for forming the magnetic core are made of ferrite, and a Pt layer or a $SiO_2$ layer serving as a reaction preventive film is formed between the ferrite layer and the metal magnetic film.

The magnetic head according to the present invention may have a structure satisfying a plurality of the abovementioned conditions.

Since the magnetic head according to the present invention has such a structure that the metal magnetic film is the laminated magnetic film formed by laminating thin Fe—M—N magnetic layers and metal layers, Fe-metal compounds are generated in the metal magnetic film and, therefore, a magnetically hard portions are generated. Since the above-mentioned portions act to prevent movement of magnetic domains, rotating magnetization is enhanced and the permeability in the high frequency regions in the metal magnetic film is raised.

The magnetic head according to the present invention has such a structure that the average thickness of one metal layer forming the metal magnetic film is made to be 0.2 nm to 10 nm and the thickness of one thin magnetic film forming the metal magnetic film is made to be 0.05 $\mu$m to 1 $\mu$m. Therefore, the preferential orientation easily takes place in the overall body of the thin magnetic layers attributable to the diffusion effect of the metal layers. By making the metal layers to have the above-mentioned thickness, the metal layers do not act as false gaps.

Moreover, the magnetic head according to the present invention is structured such that the ratio of the total thickness of the metal layers in the metal magnetic film is made to be not more than 6% of the total thickness of the metal magnetic film or not more than 5wt % of the thin magnetic films. Therefore, reduction in the effective saturated magnetic flux density can be significantly be prevented.

Other objects, features and advantages of the invention will be evident from the following detailed description of the preferred embodiments described in conjunction with the attached drawings.

DESCRIPTION OF PREFERRED EMBODIMENTS OF THE INVENTION

Preferred embodiments of the present invention will now be described with reference to the drawings.

A laminated magnetic film according to the present invention has a structure formed by laminating a thin magnetic layer and a metal layer. The thin magnetic layer has a composition expressed by $Fe_xM_yN_z$, where M is at least any one of Ta, Zr, Hf, Nb, Ti, Mo and W, and x, y and z each indicates atom percent and holds relationship as $71 \leq x \leq 85$, $6 \leq y \leq 15$ and $9 \leq z \leq 16$.

Figure 1:
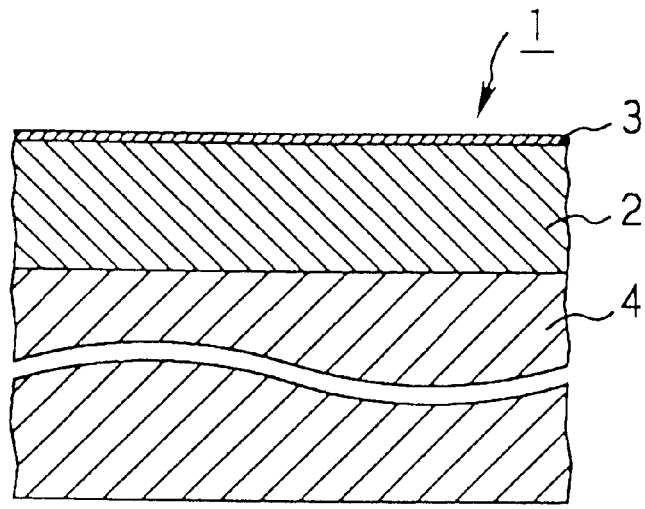
FIG. 1 is a cross sectional view showing an example of a laminated magnetic film according to the present invention.

A laminated magnetic film 1 according to this embodiment, as shown in FIG. 1, has a structure formed by laminating a thin Fe—Ta—N magnetic layer 2 and a Pt layer 3 serving as the metal layer and made of Pt. The laminated magnetic film 1 has such a structure that the thin Fe—Ta—N magnetic layer 2 is laminated on a ceramic substrate 4; and the Pt layer 3 is laminated on the thin Fe—Ta—N magnetic layer 2. The metal layer of the laminated magnetic film 1 is not limited to the Pt layer 3 made of Pt. The metal layer may be mainly made of a material selected from a group consisting of Rh, Ir, Ag, Pt, Pd and Au.

The thin Fe—Ta—N magnetic layer 2 of the laminated magnetic film 1 having the above-mentioned structure is, by a means, such as sputtering, formed on the ceramic substrate 4 to have a thickness of about 0.5 μm. The Pt layer 3 is, by sputtering or the like, formed on the thin Fe—Ta—N magnetic layer 2 to have a thickness of about 3.0 nm. The thin Fe—Ta—N magnetic layer 2 of the laminated magnetic film 1 is formed as a non-crystalline layer. On the other hand, the Pt layer 3 of the laminated magnetic film 1 is formed as a crystalline layer.

After the above-mentioned layers have been laminated, the laminated magnetic film 1 is subjected to heat treatment. The heat treatment is performed such that the laminated magnetic film 1 is heated at 550° C. for one hour in a vacuum. As a result of the heat treatment, Pt atoms forming the Pt layer 3 of the laminated magnetic film 1 are diffused into the thin Fe—Ta—N magnetic layer 2. Simultaneously, small crystal particles of αFe are dispersed and precipitated into the thin Fe—Ta—N magnetic layer 2 of the laminated magnetic film 1 as a result of the heat treatment above.

In order to efficiently mix nitrogen atoms into the thin Fe—Ta—N magnetic layer 2 of the laminated magnetic film 1, the Pt layer 3 and the thin Fe—Ta—N magnetic layer 2 are laminated.

In a state before the heat treatment is performed, the thin Fe—Ta—N magnetic layer 2 includes αFe having a lattice constant of 2.8665 angstrom and formed into a body centered cubic lattice structure (a BCC structure). αFe has a tendency of orientation (110) because of the BCC structure thereof and has a grating space d of 2.02692 angstrom. On the other hand, the Pt layer 3 has a lattice constant of 3.9240 angstrom and formed into a face-centered cubic lattice structure (an FCC structure). The Pt layer 3 has a tendency of orientation (111) and a grating space d of 2.2655 angstrom.

On the other hand, nitrogen atoms are formed into a shape which does not react with Fe and Ta when taken in at the time of performing the sputtering operation. The thin Fe—Ta—N magnetic layer 2 and the Pt layer 3 are subjected to the above-mentioned heat treatment so that Pt atoms are diffused into the thin Fe—Ta—N magnetic layer 2. Since the grating space of the Pt layer 3 is made to be somewhat larger than that of the thin Fe—Ta—N magnetic layer 2, the grating space is enlarged in the thin Fe—Ta—N magnetic layer 2. Thus, nitrogen atoms are introduced into the widened grating space so that nitrogen atom are selectively bonded with Ta which is a chemically active element. As a result, small crystal particles of αFe are generated in the thin Fe—Ta—N magnetic layer 2 and, therefore, the magnetic characteristic of the thin Fe—Ta—N magnetic layer 2 is improved.

The metal layer according to this embodiment may be mainly made of one type selected from a group consisting of Rh, Ir, Ag, Pt, Pd and Au. The grating space d of Rh is 2.19653 angstrom, that of Ir is 2.21645 angstrom, that of Ag is 2.35592 angstrom, that of Pd is 2.24635 angstrom and that of Au is 2.35478 angstrom. Since each of the foregoing metal elements Rh, Ir, Ag, Pd and Au has a grating space, which is somewhat larger than the grating space d of 2.02692 of αFe, nitrogen atoms can efficiently be mixed into the thin Fe—Ta—N magnetic layer 2 similarly to Pt atoms above.

The laminated magnetic film 1 may have such a structure that the Pt layer 3 contains at least one element selected from a group consisting of N, B, O and C. The Pt layer 3 having the foregoing structure has a tendency of the lattice constant being enlarged. Thus, the grating space in the thin Fe—Ta—N magnetic layer 2 can be enlarged. As a result, nitrogen atom can efficiently be mixed into the thin Fe—Ta—N magnetic layer 2 of the laminated magnetic film 1 so that a satisfactory soft magnetic characteristic is realized.

Note that the grating space in the thin Fe—Ta—N magnetic layer 2 may effectively be enlarged by a means for alloying Pt atoms forming the Pt layer 3 and another metal element. However, excessively enhancement of the diffusion efficiency of the Pt layer 3 with respect to that of the thin Fe—Ta—N magnetic layer 2 allows a crystal orientation control effect, to be described later, to deteriorate. Therefore, attention must be paid to prevent excessive fall of the melting point of the Pt layer 3 when it is alloyed or prevent excessive rise of the solid-solubility with respect to Fe.

Since the Pt layer 3 of the laminated magnetic film 1 is in the form of the crystalline layer having the FCC structure, the small crystal particles of αFe have substantially the same crystal orientation when precipitated into the thin Fe—Ta—N magnetic layer 2. That is, the Pt layer 3 having the orientation (111) attributable to the FCC structure have a crystal orientation control effect for causing small crystal particles of αFe to be oriented to plane (110) when diffused in the thin Fe—Ta—N magnetic layer 2. As a result, the crystalline direction of αFe is controlled in the laminated magnetic film 1 so that the laminated magnetic film 1 has a satisfactory soft magnetic characteristic.

To confirm a fact that diffusion of the Pt layer 3 into the thin Fe—Ta—N magnetic layer 2 results in the crystal orientation of Fe, which is precipitated into the thin Fe—Ta—N magnetic layer 2α, being controlled, the following experiments were performed.

Initially, sample A was manufactured so as to be subjected to a comparison with the above-mentioned laminated magnetic film 1. The sample A had such a structure that the thin Fe—Ta—N magnetic layer was laminated on a ceramic substrate, similarly to the laminated magnetic film 1. Moreover, a $SiO_2$ layer was laminated on the thin Fe—Ta—N layer. Note that the sample A had such a structure that the thickness of the ceramic substrate and the thin Fe—Ta—N magnetic layer were the same as the laminated magnetic film 1. Moreover, the thickness of the $SiO_2$ layer is the same as that of the Pt layer 3.

The X-ray diffraction patterns of the laminated magnetic film 1 and the sample A before subjected to heat treatment, were observed by an X-ray diffraction apparatus. The results of analysis of the X-ray diffraction patterns of the laminated magnetic film 1 and the sample A before subjected to heat treatment are shown in FIG. 2.

Figure 2:
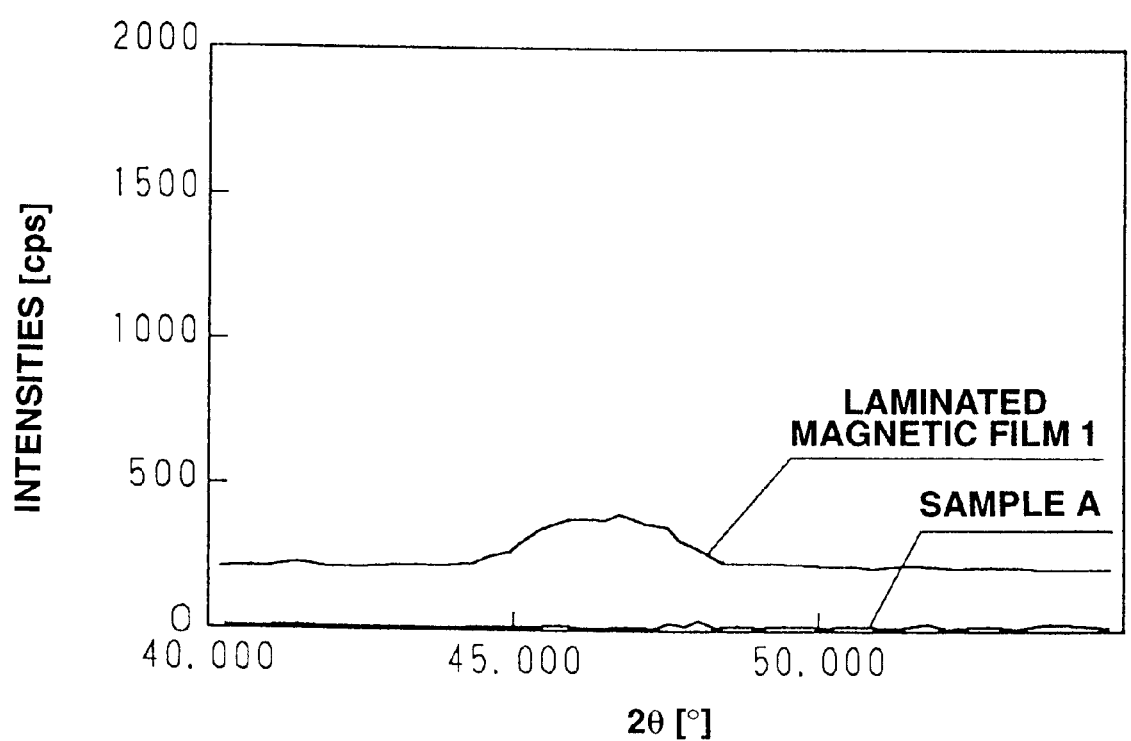
FIG. 2 is a characteristic graph showing an X-ray diffraction pattern of a laminated magnetic film 1 and that of sample A in a state where they are subjected to heat treatment.

As can be understood from FIG. 2, only a peak of orientation of plane (111) of the Pt layer 3 is observed. Therefore, a fact can be understood that the laminated magnetic film 1 has such a structure that the Pt layer 3 is the crystalline layer and the thin Fe—Ta—N magnetic layer 2 is the non-crystalline layer. Since no peak is observed in the graph for the sample A, a fact can be understood that the $SiO_2$ layer and the thin Fe—Ta—N magnetic layer are amorphous layers.

Then, the laminated magnetic film 1 and the sample A were subjected to heat treatment. The heat treatment was performed such that the laminated magnetic film 1 and the sample A were heated to 550° C. for one hour in a vacuum. After the heat treatment, the X-ray diffraction patterns of the laminated magnetic film 1 and the sample A were observed by the X-ray diffraction apparatus. The X-ray diffraction patterns of the laminated magnetic film 1 and the sample A are shown in FIG. 3.

Figure 3:
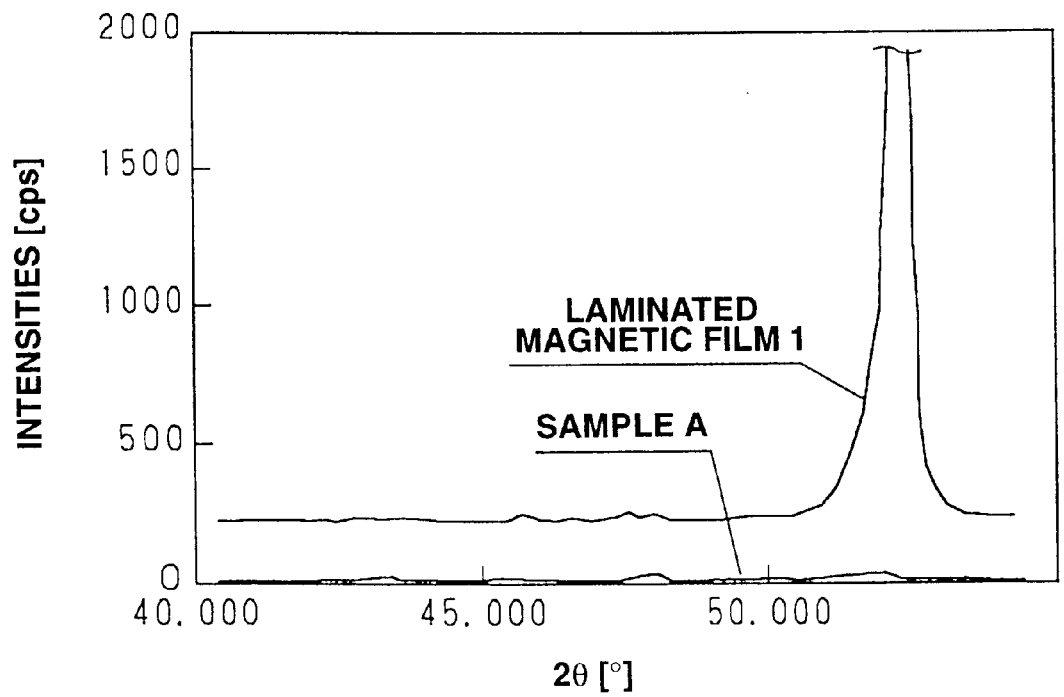
FIG. 3 is a characteristic graph showing an X-ray diffraction pattern of the laminated magnetic film 1 and the sample A after they have been subjected to heat treatment.

As can be understood from FIG. 3, the peak of the orientation of plane (111) of the Pt layer 3 has disappeared. Thus, a fact can be understood that Pt atoms forming the Pt layer 3 are diffused in the thin Fe—Ta—N magnetic layer 2. Simultaneously, the peak of the orientation of plane (110) of αFe is observed in the graph of the laminated magnetic film 1. As a result, αFe precipitated in the laminated magnetic film 1 is in the form of the crystalline structure having the orientation of plane (110).

On the other hand, small peaks of the orientation of plane (110) of αFe are observed in the graph of the sample A, as shown in FIG. 3. As can be understood from this, small crystal particles of aFe are precipitated into the thin Fe—Ta—N magnetic layer attributable to the above-mentioned heat treatment while having orientation of plane (110) in which a high degree of dispersion is realized.

When the X-ray diffraction pattern of the laminated magnetic film 1 and that of the sample A are subjected to a comparison, it can be understood that the orientation of plane (110) of small crystal particles of precipitated αFe in the laminated magnetic film 1 has been enhanced. The thus-realized result is caused from a fact that Pt atoms forming the Pt layer 3, which is the crystalline layer, are diffused into the thin Fe—Ta—N magnetic layer 2.

As described above, the orientation of plane (110) of small crystal particles of αFe can be enhanced in the laminated magnetic film 1 by locating the Pt layer 3 to be in contact with the thin Fe—Ta—N magnetic layer 2. That is, the laminated magnetic film according to the present invention has such a structure that the metal layer and the thin magnetic layer are laminated so that the crystal orientation of small crystal particles precipitated into the thin magnetic layer is controlled. As a result, change of the materials for forming the metal layer, thickness of the metal layer and the heat treatment conditions enables the permeability in the direction of the thickness of the laminated magnetic film to be controlled. Therefore, the laminated magnetic film according to the present invention is able to have a required soft magnetic characteristic.

On the other hand, the laminated magnetic film 1 has such a structure that the Pt layer 3, which is the metal layer, is laminated on the thin Fe—Ta—N magnetic layer 2. However, the laminated magnetic film 1 according to this embodiment is not limited to the above-mentioned structure. The laminated magnetic film 1 has such a structure that the Pt layer 3 and the thin Fe—Ta—N magnetic layer 2 are in contact with each other; and Pt atoms forming the Pt layer 3 diffuse into the thin Fe—Ta—N magnetic layer 2. That is, the laminated magnetic film 1 may be formed into such a structure that the Pt layer 3 is formed on the ceramic substrate 4; and the thin Fe—Ta—N magnetic layer 2 is laminated on the Pt layer 3. Also the laminated magnetic film 1 having the above-mentioned structure and subjected to the foregoing heat treatment is able to have a required soft magnetic characteristic.

The laminated magnetic film according to the present invention is not limited to the above-mentioned structure having the thin Fe—Ta—N magnetic layer 2 in the form of a single layer. Another structure may be employed in which a plurality of thin magnetic films are laminated through metal layers.

Figure 4:
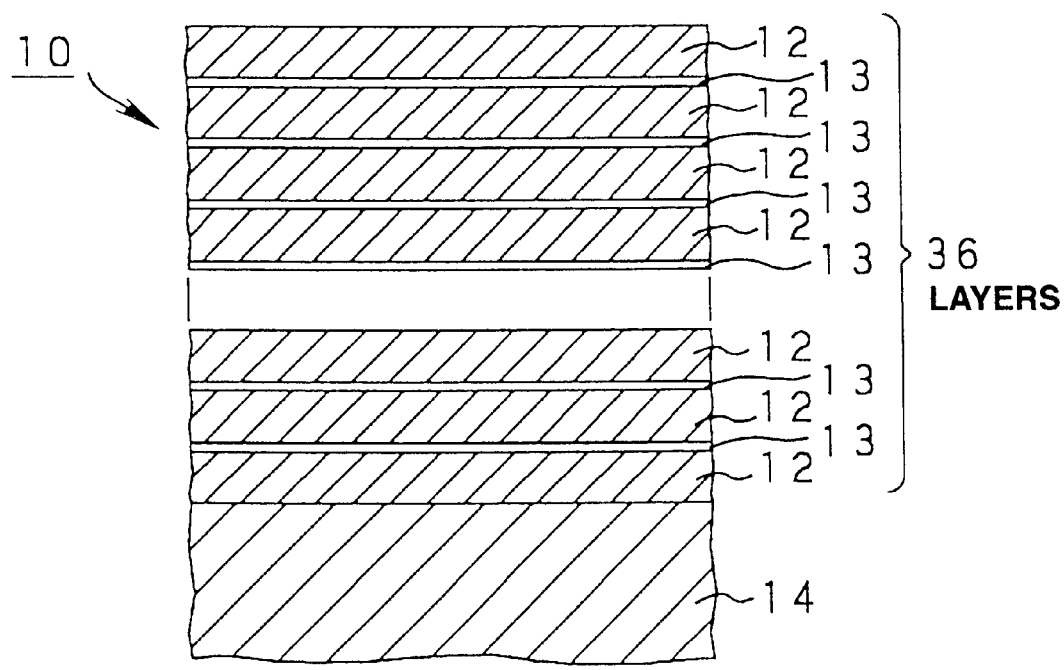
FIG. 4 is a cross sectional view showing another example of the laminated magnetic film according to the present invention.

For example, a laminated magnetic film 10 having 36 thin magnetic films as shown in FIG. 4 may be employed. The laminated magnetic film 10 is composed of 36 thin Fe—Ta—N magnetic films 12 and Pt layers 13 each of which is formed between the thin Fe—Ta—N magnetic films 12. A laminate consisting of the thin Fe—Ta—N magnetic films 12 and the Pt layers 13 are formed on a ceramic substrate 14. Moreover, the laminated magnetic film 10 has a reaction preventive film 15 formed between the laminate composed of the thin Fe—Ta—N magnetic films 12 and the Pt layers 13 and the ceramic substrate 14. Note that the metal layer of the laminated magnetic film 10 is not limited to that made of Pt. The metal layer may be made of Pd or Au.

The thin Fe—Ta—N magnetic film 12 of the laminated magnetic film 10 consists of 36 layers and has a total thickness of about 4 μm. The Pt layer 13 has a thickness of about 2.0 nm.

The laminated magnetic film 10 having the foregoing structure is manufactured by a thin-film forming method, such as sputtering, such that the thin Fe—Ta—N magnetic films 12 and the Pt layers 13 are alternately formed on the ceramic substrate 14. Then, the laminated magnetic film 10 is, similarly to the laminated magnetic film 1, subjected to heat treatment.

Since the thus-manufactured laminated magnetic film 10 has such a structure that the thin Fe—Ta—N magnetic films 12 are stacked on the Pt layer 13, Pt atoms forming the Pt layers 13 are diffused into the thin Fe—Ta—N magnetic films 12. Since each of the thin Fe—Ta—N magnetic films 12 is held between two Pt layers 13 in the direction of the thickness of the laminated magnetic film 10, Pt atoms are diffused from each of the Pt layers 13. Simultaneously, small crystal particles of aFe are dispersed and precipitated into each of the thin Fe—Ta—N magnetic films 12 of the laminated magnetic film 10.

The crystal orientation of the small crystal particles of aFe is controlled by the influences of Pt atoms when the small crystal particles of αFe are precipitated.

Figure 5:
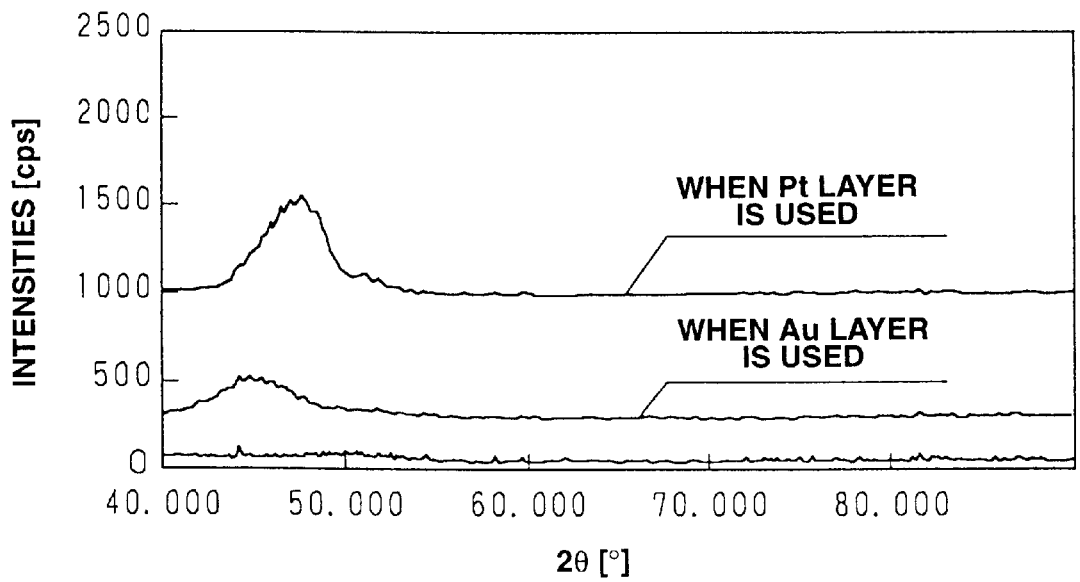
FIG. 5 is a characteristic graph showing an X-ray diffraction pattern of a laminated magnetic film 10 before subjected to heat treatment.
Figure 6:
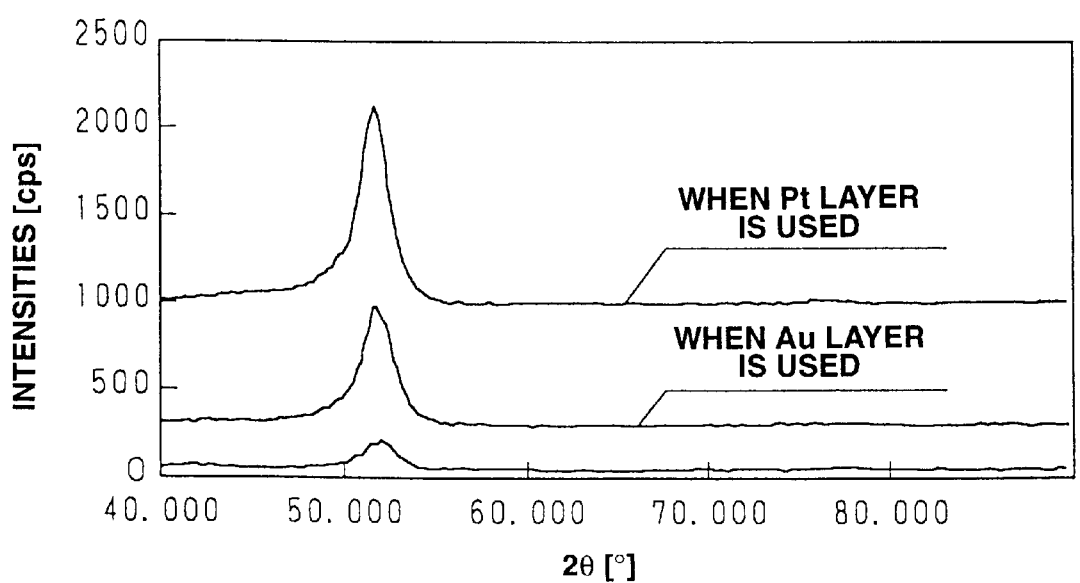
FIG. 6 is a characteristic graph showing an X-ray diffraction pattern of the laminated magnetic film 10 after subjected to heat treatment.

In order to confirm the foregoing fact, the X-ray diffraction pattern of the laminated magnetic film 10 before the heat treatment and the X-ray diffraction of the same after it had been subjected to the heat treatment were observed by the X-ray diffraction apparatus. FIG. 5 shows the X-ray diffraction pattern of the laminated magnetic film 10 before the heat treatment is performed. FIG. 6 shows the X-ray diffraction pattern of the laminated magnetic film 10 after it has been subjected to the heat treatment. Also the X-ray diffraction pattern of the laminated magnetic film 10 realized when Au is employed as the metal atoms for forming the metal layer is shown in FIGS. 5 and 6.

As can be understood from FIG. 5, only plane (111) of Pt crystal is observed in a case where the metal layers are the Pt layers 13. In a case where the metal layers are the Au layers, only plane (111) of Au crystal is observed. In both of the foregoing cases, the thin Fe—Ta—N magnetic films 12 of the laminated magnetic film 10 are non-crystalline layer and the metal layers are crystalline layers.

Another fact can be understood that heat treatment, to which the laminated magnetic film 10 is subjected, allows X-ray diffraction peaks showing the plane (111) of Pt crystal and plane (111) of Au crystal in the metal layers to disappear, as shown in FIG. 6. In both of the foregoing cases, X-ray diffraction peaks corresponding to the plane (110) of small crystal particles of αFe are observed.

As a result, facts can be understood that metal atoms forming the metal layers of the laminated magnetic film 10 are diffused into the thin Fe—Ta—N magnetic films 12 and that small crystal particles of αFe having the orientation of plane (110) are precipitated in the thin Fe—Ta—N magnetic films 12.

Since the plural thin Fe—Ta—N magnetic films 12 of the laminated magnetic film 10 are laminated through the Pt layers 13, diffusion of Pt atoms forming the Pt layers 13 is performed quickly. It leads to a fact that the laminated magnetic film 10 having the above-mentioned structure has enhanced orientation of plane (110) of small crystal particles of αFe as compared with the thin Fe—Ta—N magnetic layer in the form of a single layer.

The structure of an embodiment of a magnetic head according to the present invention will now be described with reference to the drawings.

Figure 7:
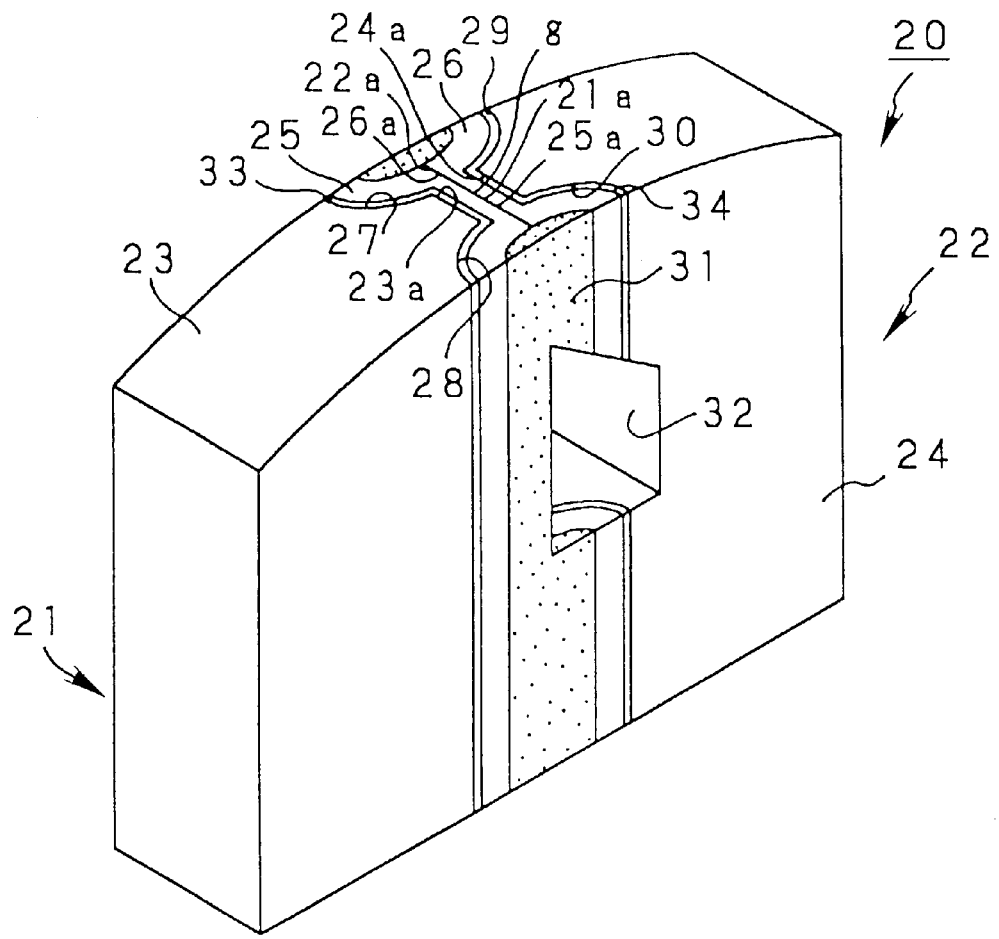
FIG. 7 is a perspective view showing an embodiment of a magnetic head according to the present invention.
Figure 8:
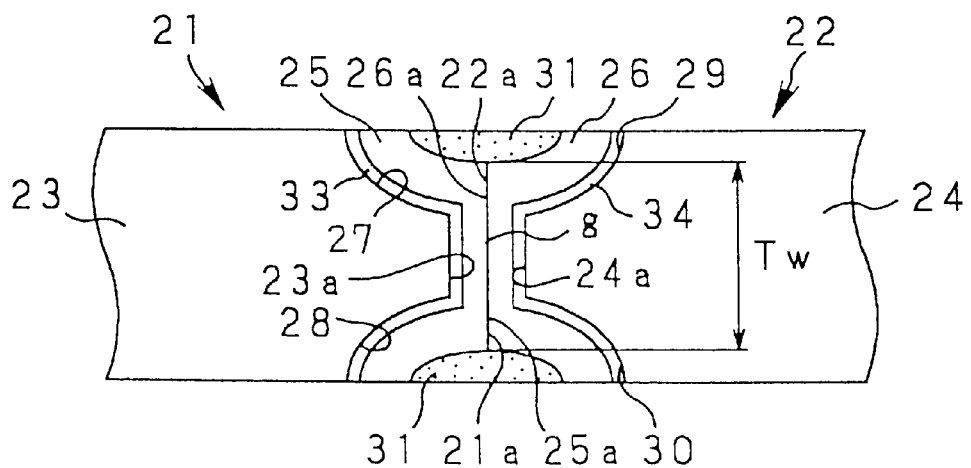
FIG. 8 is an enlarged plan view showing an essential portion of the embodiment of the magnetic head according to the present invention.

A magnetic head 20 according to this embodiment, as shown in FIGS. 7 and 8, is formed by abutting a pair of right and left halves 21 and 22 of a core of the magnetic head 20 manufactured individually on the two sides of a magnetic gap g located substantially at the central portion between the joined surfaces of magnetic recording mediums, the pair of the halves 21 and 22 of the magnetic core being integrated by abutting magnetic gap forming surfaces 21a and 22a which are abutting surfaces.

The halves 21 and 22 of the magnetic core are composed of corresponding magnetic-core substrates 23 and 24, which are sub-core sections, and metal magnetic films 25 and 26, which are main core sections. Each of the magnetic-core substrates 23 and 24 is made of a soft magnetic oxide, such as Mn—Zn ferrite or Ni—Zn ferrite to form a sub-core section forming a closed magnetic passage together with the metal magnetic films 25 and 26. The magnetic-core substrates 23 and 24 have, adjacent to main surfaces 23a and 24a of the magnetic-core substrates 23 and 24 opposite to the magnetic gap forming surfaces 21a and 22a, track width restricting grooves 27, 28, 29 and 30 for restricting the track width Tw of the magnetic gap g. Each of the track width restricting grooves 27, 28, 29 and 30 has a circular arc shape formed from a position adjacent to each of two ends of the magnetic gap g into a direction of the depth of the magnetic head. Each of the track width restricting grooves 27, 28, 29 and 30 is filled with a non-magnetic material 31, such as glass, in order to maintain the contact characteristic with the magnetic recording medium and to prevent unsymmetrical wear occurring due to sliding.

The main surface 24a of the magnetic core substrate 24 of the magnetic-core substrates 23 and 24, which is opposite to the magnetic gap forming surface 21a, has a coil receiving groove 32 having a U-like-shape facing side to restrict the depth of the magnetic gap g and to wind a coil (not shown). The coil receiving groove may be formed in the other magnetic core substrate 23.

On the other hand, the metal magnetic films 25 and 26 serve as the main core section forming a closed magnetic passage together with the magnetic-core substrates 23 and 24, the metal magnetic films 25 and 26 being formed in the corresponding main surfaces 23a and 24a which are opposite to the magnetic gap forming surfaces 21a and 22a and which are surfaces opposite to the magnetic-core substrates 23 and 24. Each of the metal magnetic films 25 and 26 is formed from a front gap portion to a back gap portion. Therefore, the opposite surfaces 25a and 26a of the metal magnetic films 25 and 26 are formed into the magnetic gap forming surfaces 21a and 22a of the halves 21 and 22 of the magnetic core. The metal magnetic films 25 and 26 are formed on the inner surfaces of the track width restricting grooves 27, 28, 29 and 30 as well as the main surfaces 23a and 24a opposite to the magnetic-core substrates 23 and 24. The metal magnetic film 25 is as well as formed on the overall surface of the inside portion of the coil receiving groove 32 or a portion of the same.

The metal magnetic films 25 and 26 of the magnetic head 20 are formed into laminated magnetic films each of which is composed of a thin magnetic layer and a metal layer.

The thin magnetic layer has a composition $Fe_xM_yN_z$ where M is at least any one of Ta, Zr, Hf, Nb, Ti, Mo and W, and x, y and z each indicates atom percent and holds relationship as $71 \leq x \leq 85$, $6 \leq y \leq 15$ and $9 \leq z \leq 16$. The metal layer contains any one of Pt, Pd and Au as the component thereof. The magnetic head 20 according to this embodiment is the Pt layer.

The magnetic head 20 has such a structure that reaction preventive films 33 and 34 are formed on the corresponding magnetic-core substrates 23 and 24; and the metal magnetic films 25 and 26 are formed on the reaction preventive films 33 and 34 so that diffusion reactions among ferrite, which is a usual metal layer for forming the magnetic-core substrates 23 and 24, and the metal magnetic films 25 and 26 are prevented to restrict generation of a false gap.

Figure 9:
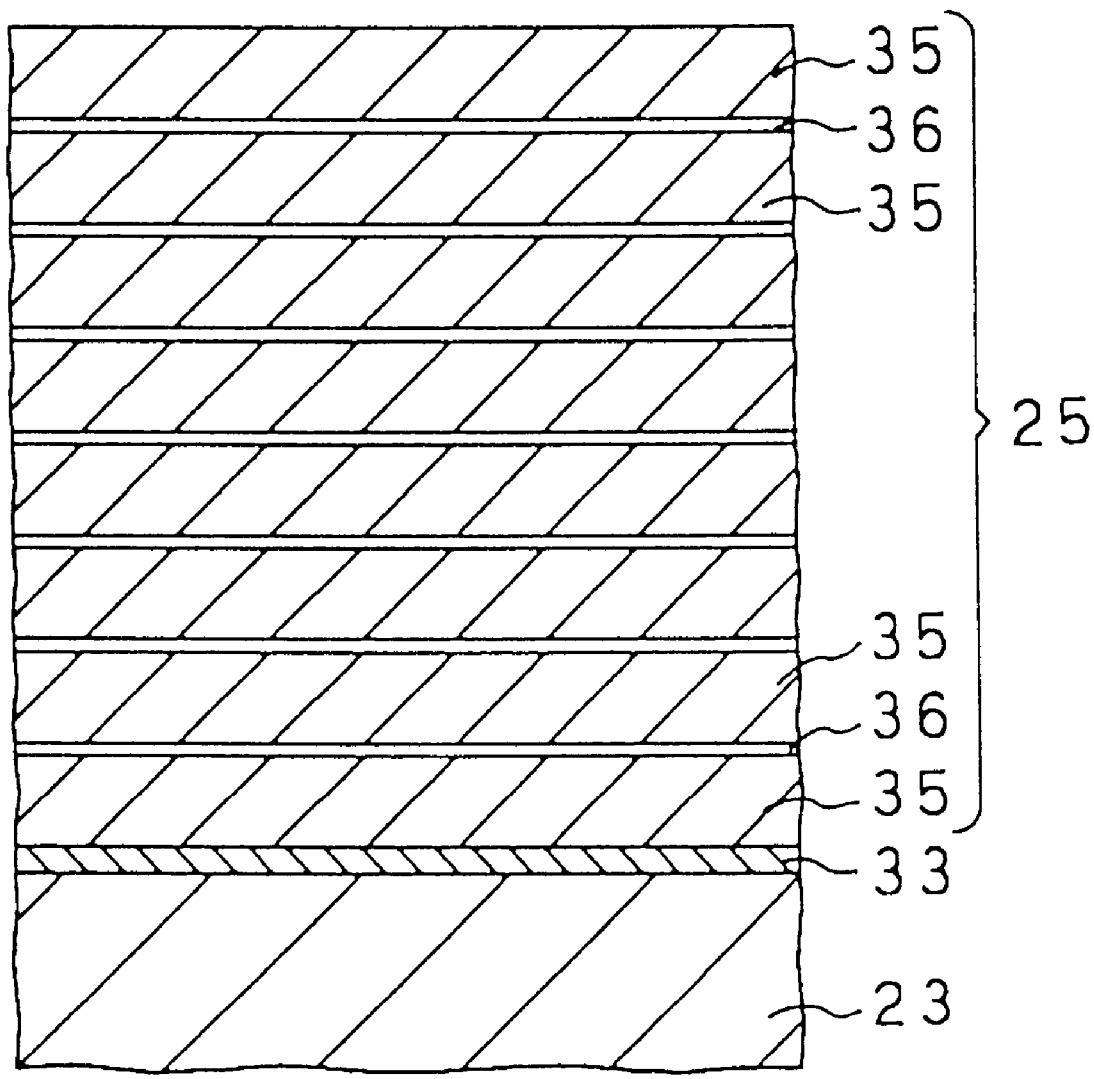
FIG. 9 is an enlarged cross sectional view showing a metal magnetic film of the magnetic head according to the present invention.

As described above, the magnetic head 20 has such a structure that the metal magnetic films 25 and 26 are formed into the laminated magnetic films each consisting of the thin Fe—M—N magnetic layer and the Pt layer. Each of the metal magnetic films 25 and 26 is, as shown in FIG. 9 in which only the metal magnetic film 25 is illustrated, formed into the laminated magnetic film formed by alternately laminating the thin Fe—M—N magnetic layers 35 and the Pt layers 36 on the reaction preventive film 33.

The thin Fe—M—N magnetic layers 35 and the Pt layers 36 may be formed by a vacuum method for forming a thin film, such as a vacuum evaporation method, a sputtering method or an ion plating method. In this case, increase in the sputtering processes can be solved by forming the apparatus into a multi-target type structure.

When the reaction preventive film 33 is formed into the Pt layer, the reaction preventive film 33 is able to as well as have a diffusion effect. The reaction preventive film 33 may be a $SiO_2$ layer which is a general base film of the above-mentioned type magnetic head. When the reaction preventive film 33 is the Pt layer, the diffusion reactions taking place in the interface between the magnetic-core substrates 23 and 24, which is made of ferrite, and the metal magnetic films 25 and 26 can be prevented and, thus, forming of a reactive layer, which interferes with an original magnetic flux generated from the magnetic gap g can be prevented.

In order to make the diffusion reaction preventive function of the reaction preventive film 33 to be more reliable, the reaction preventive film 33 may be, in place of Pt, made of a metal element, for example, Ti, Mo, V, Cr, W, Co or Ni, having a melting point not lower than 1500° C., which is the melting point of Fe. The reaction preventive film 33 may be made of a compound, such as $Si_3N$ or $Al_2O_3$, in place of $SiO_2$, or formed into a laminated film of the foregoing compound and the above-mentioned metal element.

It is preferable that the thickness of the reaction preventive film 33 be about 1 nm to about 10 nm. If the thickness is smaller than 1 nm, the reaction preventive effect becomes unsatisfactory. If the thickness is larger than 10 nm, there arises a risk that the reaction preventive film 33 acts as a false gap. If the reaction preventive film 33 is a non-magnetic film, the reaction preventive film 33 must be a thin film not to act as the false gap.

The uppermost film of the laminated magnetic film forming the metal magnetic film 25 of the magnetic head 20 may be the thin magnetic Fe—M—N layer 25 or the Pt layer 26.

As a matter of course, also the metal magnetic film 26 formed on the other magnetic core substrate 24 is formed into the multi-layer structure consisting of the thin Fe—M—N magnetic layer and the Pt layer, similarly to the metal magnetic film 25.

The thickness of each thin Fe—M—N magnetic layer 35 forming each of the metal magnetic films 25 and 26 of the magnetic head 20 is made to be 0.05 $\mu$m to 0.5 $\mu$m. The average thickness of each Pt layer 36 forming each of the metal magnetic films 25 and 26 is 0.3 $\mu$m to 7 nm.

Moreover, the total thickness of the Pt layers 36 in the metal magnetic films 25 and 26 of the magnetic head 20 is 6% or less of the overall thickness of the metal magnetic films 25 and 26.

The magnetic head according to the present invention may be structured such that the ratio of Pt with respect to Fe and M in the thin magnetic films and Pt in the Pt layers in the metal magnetic film may be made to be 5 atom % or lower.

As described above, the magnetic head 20 has such a structure that the thin Fe—M—N magnetic layers 35 and the Pt layers 36 are, as metal magnetic films 25 and 26, laminated on the magnetic gap forming surfaces 21a and 22a of the pair of the halves 21 and 22 of the magnetic core.

The thin Fe—M—N magnetic layers 35 are, as described when description of the manufacturing method will be performed, formed such that microcrystal is generated from a non-crystal state by subjecting the formed films to the heat treatment. In the thus-manufactured magnetic head 20, the diffusion effect of the Pt layer 36 causes intense orientation (110) of αFe to take place in the thin Fe—M—N magnetic layers 35 after the heat treatment has been performed. As a result, the uniformity of the magnetism of the metal magnetic films 25 and 26 is improved so that the soft magnetic characteristic is improved.

In the magnetic head 20, Fe—Pt compounds are generated in the metal magnetic films 25 and 26 so that hard magnetic portions are generated. Since the generated portions act to prevent movement of magnetic domains, the rotating magnetization is enhanced and, therefore, the permeability in the high frequency regions in the metal magnetic films 25 and 26 is raised.

Since the magnetic head 20 is structured such that the average thickness of each of the Pt layers 36 forming the metal magnetic films 25 and 26 is made to be 0.3 nm to 7 nm; and the thickness of each of the thin Fe—M—N magnetic layers 35 forming the metal magnetic films 25 and 26 is made to be 0.05 $\mu$m to 0.5 $\mu$m, the above-mentioned preference orientation in the thin Fe—M—N magnetic layers 35 occurring attributable to the diffusion effect of the Pt layer 36 easily takes place in the overall body of the film. Since each of the Pt layers 36 has the above-mentioned thickness, the Pt layers 36 do not act as false gaps.

The magnetic head according to this embodiment has such a structure that the ratio of the total thickness of the Pt layers 36 in the metal magnetic films 25 and 26 is 6% or less of the overall thickness of the metal magnetic films 25 and 26. Therefore, reduction of the effective saturated magnetic flux density can significantly be restricted.

A method of manufacturing the magnetic head according to this embodiment will sequentially be described.

Figure 10:
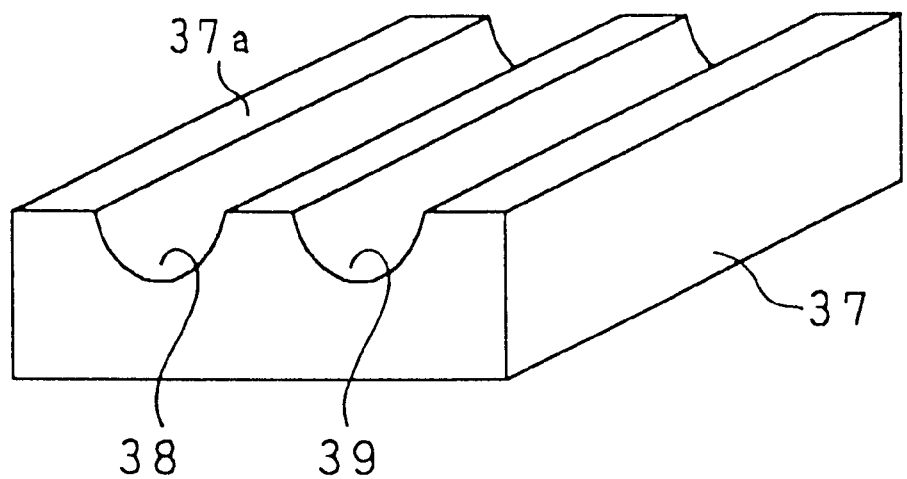
FIG. 10 is a perspective view showing a step in the sequential process for manufacturing the magnetic head according to the present invention in which a track width restricting groove is formed in the substrate.

Initially, a plate-like substrate 37 made of, for example, Mn—Zn ferrite is prepared, as shown in FIG. 10. Then, a plurality of (two in the case shown in FIG. 10) track width restricting grooves 38 and 39 each having a substantially semi-circular cross sectional shape are formed on a main surface 37a of the substrate 37, as shown in FIG. 10. The track width restricting grooves 38 and 39 are formed in the direction of, for example, the width of the substrate 37. The track width restricting grooves 38 and 39 are formed apart from each other for a distance which is the same as a predetermined width of the track.

Figure 11:
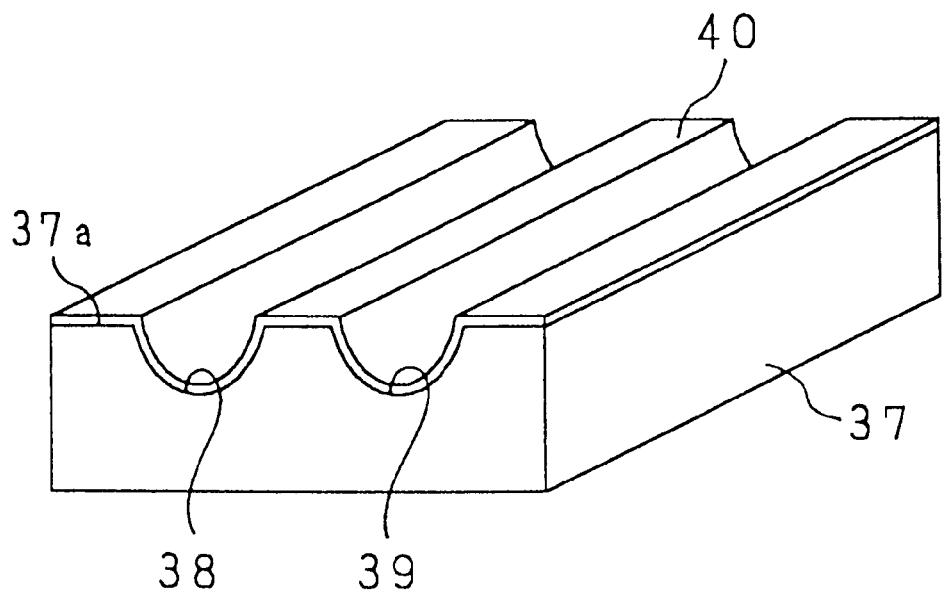
FIG. 11 is a perspective view showing a step in the sequential process for manufacturing the magnetic head according to the present invention in which a reaction preventive film is formed in the substrate.

Then, a reaction preventive film 40 is, as shown in FIG. 11, formed on the main surface 37a of the substrate 37 including the track width restricting grooves 38 and 39 by sputtering or the like. As the reaction preventive film 40, a SiO$_2$ layer having a thickness of 4 nm is formed in order to improve the reaction preventive effect.

Figure 12:
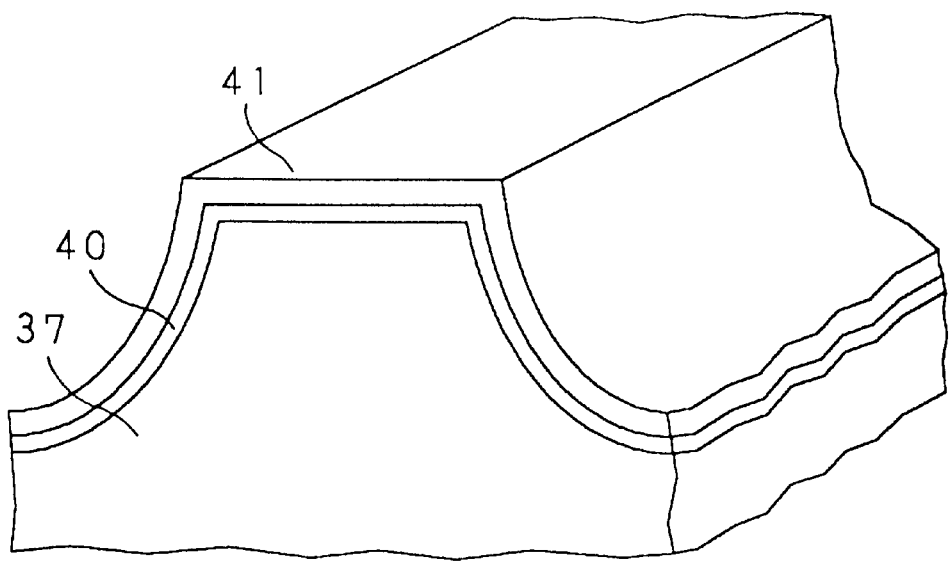
FIG. 12 is an enlarged perspective view showing a step in the sequential process for manufacturing the magnetic head according to the present invention in which a thin Fe—M—N magnetic layer is formed on the reaction preventive film.
Figure 13:
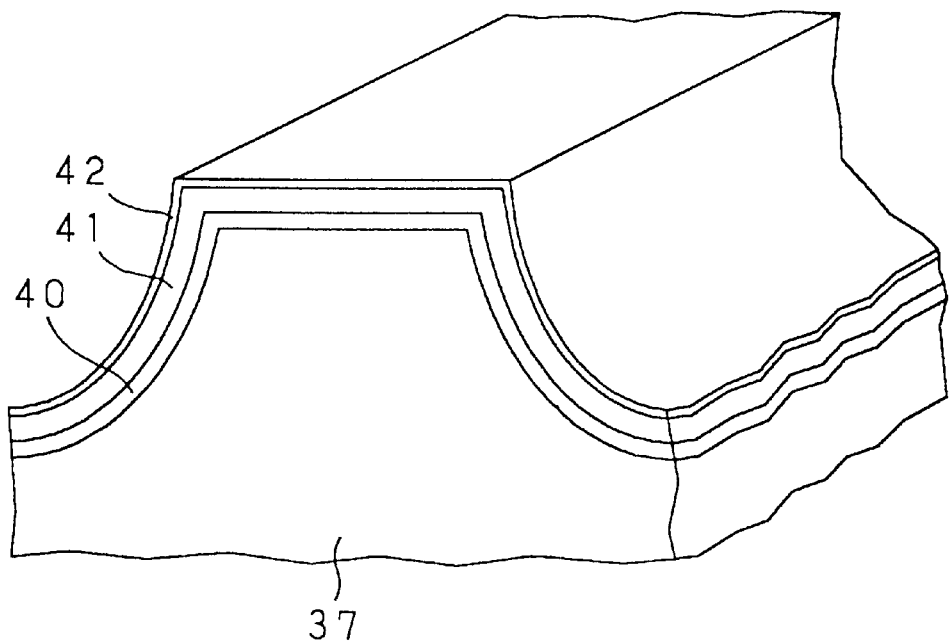
FIG. 13 is an enlarged perspective view showing a step in the sequential process for manufacturing the magnetic head according to the present invention in which a Pt layer is formed on the thin Fe—M—N magnetic layer.
Figure 14:
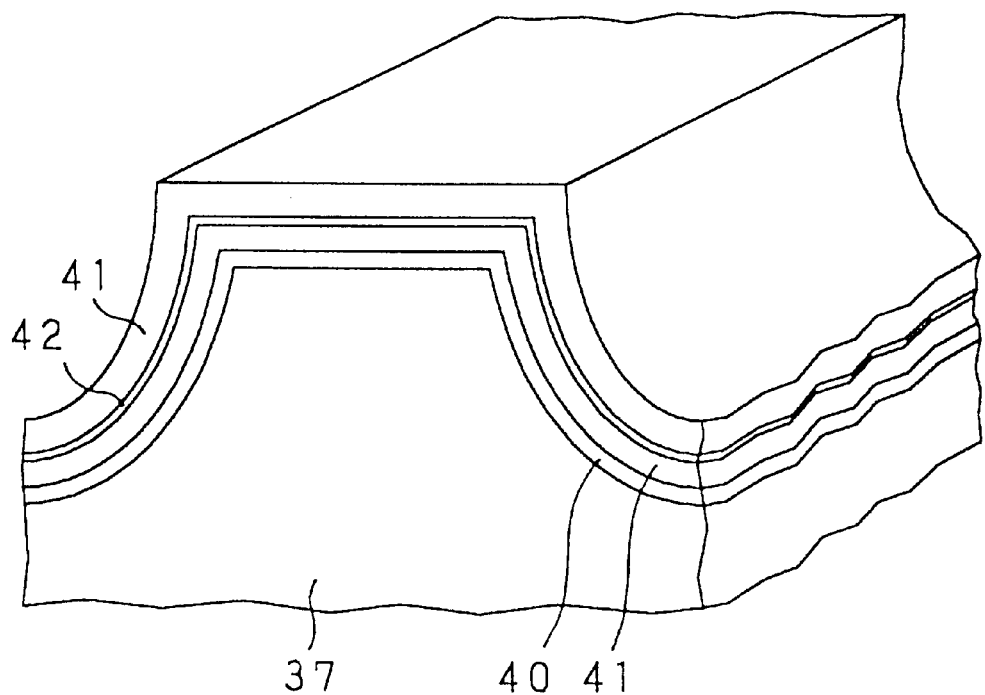
FIG. 14 is an enlarged perspective view showing a step in the sequential process for manufacturing the magnetic head according to the present invention in which a thin Fe—M—N magnetic layer is formed on the Pt layer.
Figure 15:
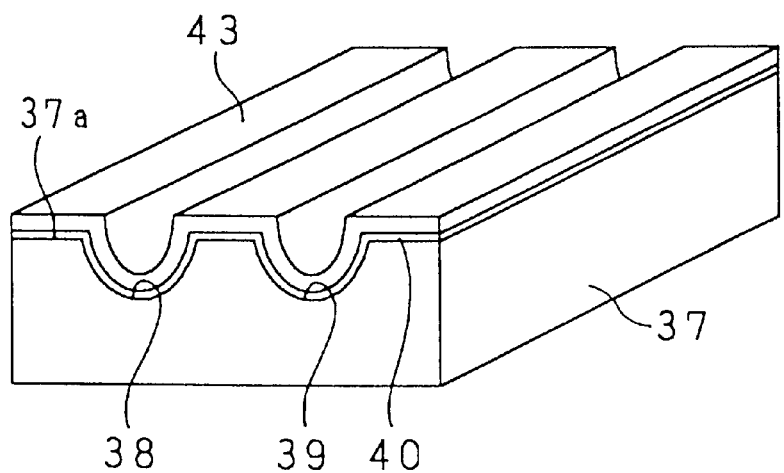
FIG. 15 is a perspective view showing a step in the sequential process for manufacturing the magnetic head according to the present invention in which a state in which the reaction preventive film and the metal magnetic film have been formed on the substrate is shown.

Then, as shown in FIG. 12, a thin Fe—M—N magnetic layer 41 having the above-mentioned composition is formed on the reaction preventive film 40. Then, as shown in FIG. 13, a Pt layer 42 is formed on the thin Fe—M—N magnetic layer 41, and then a thin Fe—MN—N magnetic layer 41 is again formed on the Pt layer 42. The thin Fe—M—N magnetic layers 41 and the Pt layers 42 are sequentially laminated as described above so that a metal magnetic film 43, which is a laminated magnetic film consisting of the thin Fe—M—N magnetic layers 41 and the Pt layers 42, is formed, as shown in FIG. 15. Note that the thin Fe—M—N magnetic layer 41 is in a non-crystal state in the above-mentioned state.

As the thin Fe—M—N magnetic layer 41, a thin magnetic film of small crystal of Fe—Ta—N is formed. That is, the metal magnetic film 43 has a multi-layer structure as Fe—Ta—N layer/Pt layer, . . . , /thin Fe—Ta—N layer/Pt layer.

Although the first layers is the thin Fe—Ta—N layer and the final layer is the Pt layer, the first layer and the final layer may be either of the thin Fe—M—N magnetic layer 41 or the Pt layer to obtain a similar effect. Although the thin Fe—Ta—N layer is employed as the thin Fe—M—N magnetic layer 41, the metal portion indicated by symbol M may be another metal element to obtain a similar effect.

As described above, the thickness of the SiO$_2$ layer of the reaction preventive film 40 is made to be 4 nm to make the overall thickness of the metal magnetic film 43, which is the laminated magnetic film of the thin magnetic films of small crystal particles of Fe—Ta—N and the Pt layers, to be 4 μm. Moreover, the number of the thin Fe—M—N magnetic layers 41 which is the thin magnetic films of small crystal particles of Fe—Ta—N of the metal magnetic film 43 is made to be six.

Then, a substrate similar to the substrate 37 is prepared and a process similar to the above-mentioned process is performed so that track width restricting grooves, a reaction preventive film and metal magnetic films were formed. Moreover, a coil receiving groove having a cross section in the form of a U-shape facing side is formed in the substrate, the coil receiving groove being formed in a direction perpendicular to the surface in which the track width restricting groove is formed.

Then, a SiO$_2$ film serving as a spacer for the magnetic gap is formed on the metal magnetic film of each substrate, the SiO$_2$ film having a thickness of 100 nm.

Figure 16:
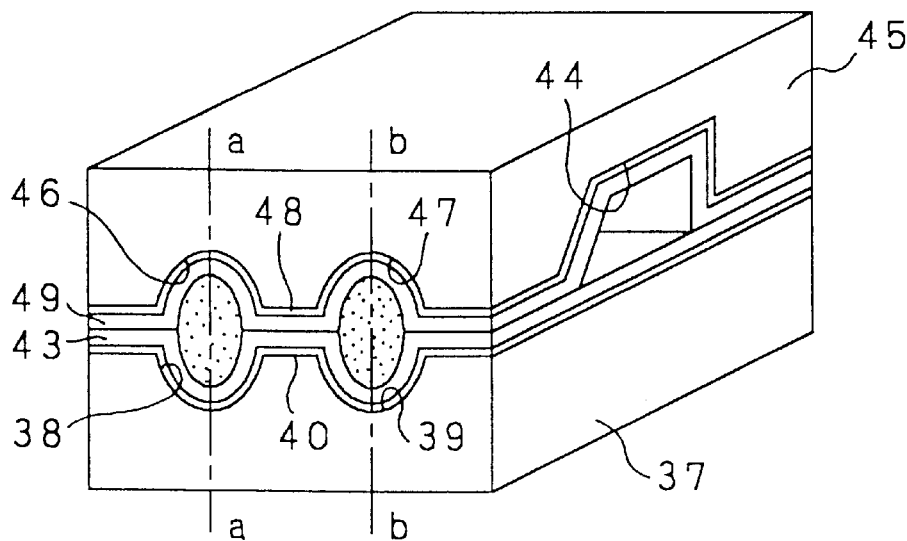
FIG. 16 is a perspective view showing a step in the sequential process for manufacturing the magnetic head according to the present invention in which substrates are joined and integrated.

As shown in FIG. 16, the substrate 37 and a substrate 45 having a coil receiving groove 44 similar to that of the substrate 37 were abutted against each other while aligning the positions of the track width restricting grooves 38, 39, 46 and 47. Then, a glass rod is inserted into the coil receiving groove 44, and then heat treatment is performed to fuse the substrates 37 and 45 by the glass.

As a result of the heat treatment for fusing the substrates 37 and 45 by the glass, small crystal is formed in the thin Fe—M—N magnetic layer 41 which has been in a non-crystal state so that the thin magnetic film of small crystal particles of Fe—Ta—N is formed.

At this time, the diffusion effect of the Pt layer 42 causes intense orientation of plane (110) of αFe to take place in the thin Fe—M—N magnetic layer 41, which is the thin magnetic film of small crystal particles of Fe—Ta—N. Thus, the uniformity of the magnetism of the metal magnetic film 43 is improved so that the soft magnetic characteristic is improved.

At this time, Fe—Pt compounds are generated in the metal magnetic film 43 so that magnetically hard portions are generated in the metal magnetic film 43. Since the above-mentioned portions act to prevent movement of magnetic domains, the rotating magnetization is enhanced so that the permeability in the high frequency regions in the metal magnetic film 43 is raised.

As described above, the substrate 45 having the coil receiving groove 44 has, in the track width restricting grooves 46 and 47 and the substrate 45 thereof, the SiO$_2$ layer serving as a reaction preventive film 48 and a thin metal magnetic film 49, which is the laminated magnetic film of the thin Fe—M—N magnetic layer which is the thin magnetic films of small crystal particles of Fe—Ta—N and the Pt layers, is formed. In order to prevent generation of defects, such as breakage of glass, attributable to the stress of the magnetic film, a mask or the like may be used to prevent forming of the film on the overall surface in the coil receiving groove 44 when the above-mentioned films are formed by sputtering or the like. Even if the foregoing mask is used, the output denoting the reproduction is not affected.

Finally, the main surfaces, which are used as the joining surfaces of the magnetic recording mediums, are ground into the cylindrical shape. Then, slicing is performed at the positions indicated by line a—a and line b—b shown in FIG. 16 so that the magnetic head 20 as shown in FIGS. 7 and 8 is manufactured.

Although the description has been performed about the structure in which the thin magnetic films of small crystal particles of Fe—Ta—N is employed as the thin Fe—M—N magnetic layer, the metal portion indicated by the symbol M may be another metal element to obtain a similar effect. Moreover, a similar manufacturing process can be employed.

As a matter of course, the present invention is not limited to the above-mentioned magnetic head and the same may be applied to a variety of magnetic heads within the scope of the present invention.

Although the description has been performed about the magnetic head according to the present invention and having such a structure that the thin metal magnetic film is formed in parallel to the magnetic gap, the present invention may, of course, be applied to a magnetic head having such a structure that the magnetic gap is formed in the abutting surfaces of metal magnetic films respectively formed on diagonal surfaces, which are formed by diagonal cutting and in which the magnetic gap is formed. Moreover, the present invention may, of course, be applied to a magnetic head having such a structure that the magnetic gap has an azimuth angle.

EXAMPLES

Examples of the present invention will now be described in accordance with results of experiments.

Example 1

In Example 1, influence of the number of the thin Fe—M—N magnetic layers in the metal magnetic film upon the plane orientation of the thin Fe—M—N magnetic layer was investigated.

Figure 17:
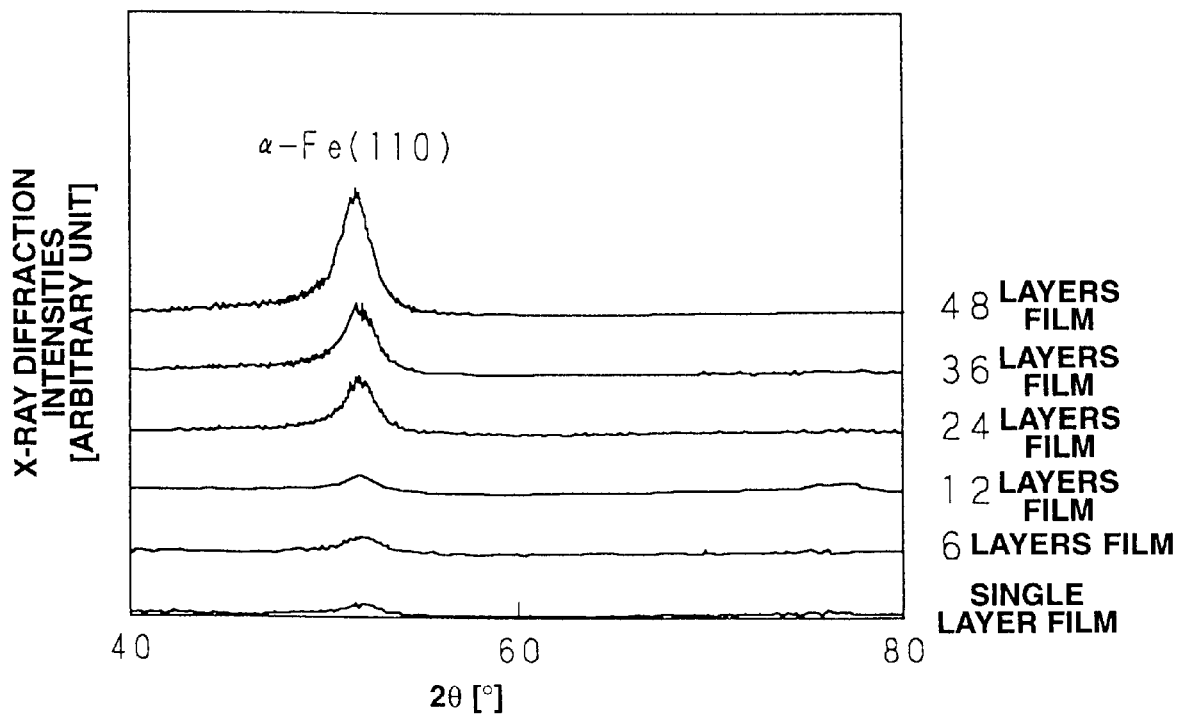
FIG. 17 is a chart showing X-ray diffraction patterns of metal magnetic films.

A laminated magnetic film formed by laminating the thin Fe—Ta—N magnetic layer, which was the thin Fe—M—N magnetic films, and the Pt layers was formed on a substrate made of Mn—Zn ferrite. Then, the laminated magnetic film was subjected to heat treatment at 550° C., and then the X-ray diffraction pattern was investigated. In this example, the overall thickness of the laminated magnetic film was fixed to 4 μm and the average thickness of each Pt layer was fixed to 3 nm. Moreover, five types of laminated magnetic films were prepared which respectively had 6, 12, 24, 36 and 48 thin magnetic films to investigate the X-ray diffraction patterns. Results are shown in FIG. 17. FIG. 17 as well as shows results of a single-layer film having only thin Fe—M—N magnetic film having a thickness of 4 μm formed on the substrate.

As can be understood from FIG. 17, the peak of the plane (110) of αFe is enlarged in proportion to the number of the thin magnetic films. That is, in the case where the thin magnetic films of small crystal particles of Fe—Ta—N are laminated through the Pt layers, the diffusion effect of the thin Pt films intensifies the orientation of plane (110) of αFe in the thin magnetic films of small crystal particles of Fe—Ta—N when small crystal is formed in a non-crystal state by performing the heat treatment after the thin film, which is formed into the thin magnetic films of small crystal particles of Fe—Ta—N, has been formed. Thus, a fact was confirmed that the soft magnetic characteristic in the direction of the thickness of the film was improved. The foregoing effect can be obtained from the thin Fe—M—N magnetic layer in which the metal portion indicated by the symbol M is another metal element, as well as the thin magnetic films of small crystal particles of Fe—Ta—N.

Example 2

In this example, influences of the number (the thickness) of the thin Fe—M—N magnetic layers in the metal magnetic film and the ratio of the total thickness of the Pt layers in the metal magnetic film with respect to the total thickness of the above-mentioned metal magnetic film upon the reproduced output from the magnetic head were investigated.

That is, seven types of magnetic heads according to the present invention and respectively having metal magnetic films were prepared which were laminated magnetic films having such structures that the total thickness of the metal magnetic film was fixed to 4 μm, the average thickness of the Pt layers was fixed to 3 nm and the number of the thin Fe—M—N magnetic layers was varied to 6, 12, 24, 36, 48, 72 and 96. Moreover, a magnetic head having only a thin Fe—M—N magnetic layer having a thickness of 4 μm and serving as the metal magnetic film was prepared. Then, the reproduced outputs from the prepared magnetic heads were measured. Also in this example, a thin magnetic films of small crystal particles of Fe—Ta—N were employed as the thin Fe—M—N magnetic layers.

The reproduced output was measured by using a head-fixed-type drum tester while making the relative speed to be 3.8 m/s and the frequency f to be 7 MHz. As a recording head, a MIG head was employed in which thin Fe—Ru—Ga—Si films were, in parallel, formed on the magnetic gap. Results are shown in FIG. 18.

Figure 18:
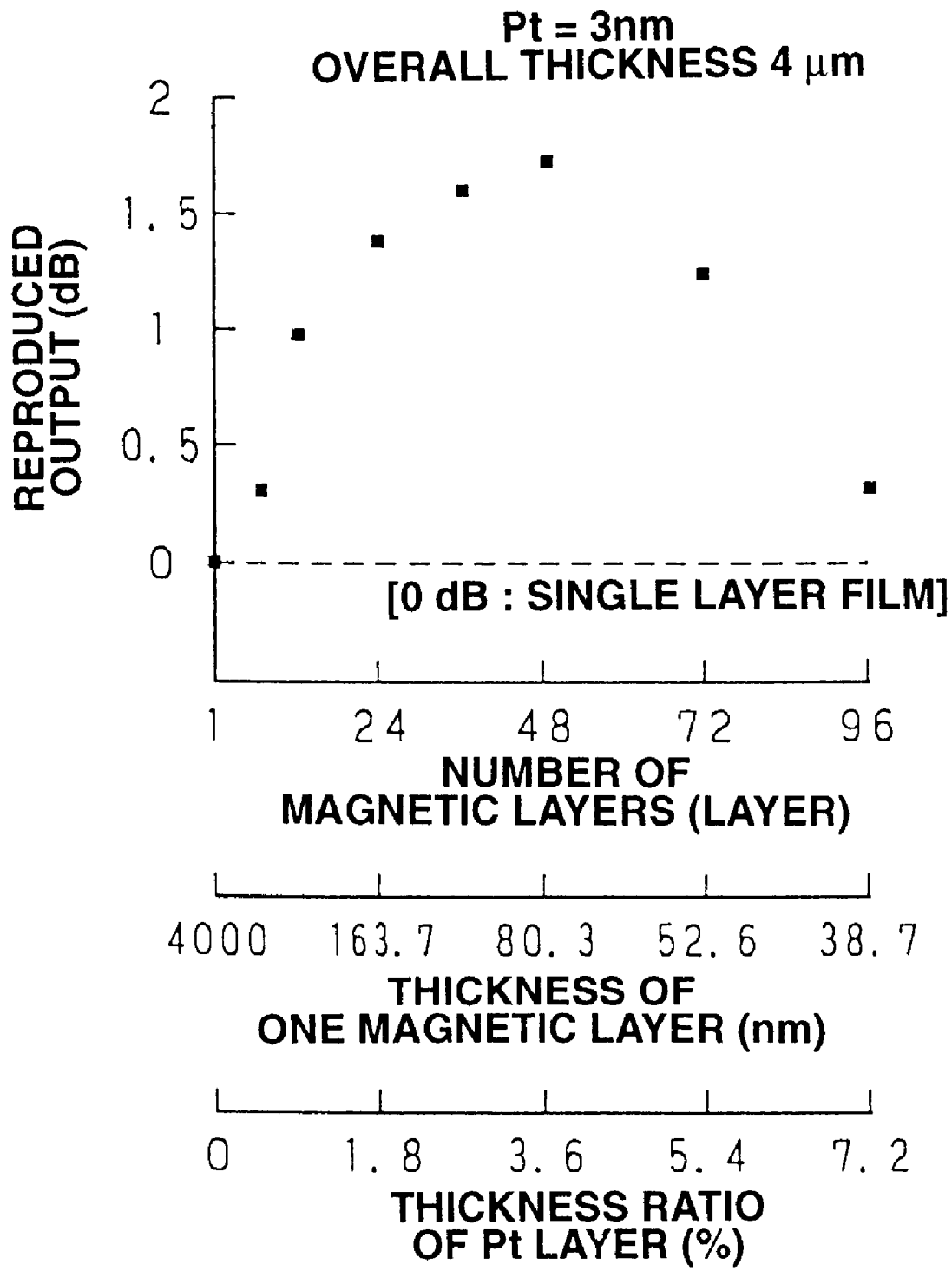
FIG. 18 is a characteristic graph showing the relationship between the number of magnetic layers and relative outputs.

FIG. 18 shows the reproduced outputs from the above-mentioned magnetic heads as relative outputs when the reproduced output from the magnetic head having only the thin Fe—M—N magnetic layer having the thickness of 4 μm was made to be 0 dB. In FIG. 18, the axis of ordinate stands for the relative outputs and the axis of abscissa stands for the number of the magnetic layers, which are the thin Fe—M—N magnetic layers, the thickness of one metal layer and the thickness ratio of the Pt layers which is the ratio of the total thickness of the Pt layers in the metal magnetic films with respect to the overall thickness of the metal magnetic films.

As can be understood from FIG. 18, the laminated magnetic film included the Pt layers interposed therein so that the reproduced output was improved. Moreover, the number of the thin Fe—M—N magnetic layers and that of the Pt layers were increased to certain numbers, the orientation of αFe (110) was intensified so that the reproduced output was furthermore improved. As for the metal layer, the reproduced output was improved in a range in which the thickness was smaller than 0.5 μm. Therefore, a fact was confirmed that the diffusion effect of the Pt layers caused the above-mentioned preferential orientation to easily take place in the overall body of the film.

If the number of the thin Fe—M—N magnetic layers and the Pt layers are too large and the thickness ratio of the Pt layers exceeds about 6%, the reproduced output deteriorates. As for the thickness of the magnetic layer, the reaction preventive film again deteriorates if the thickness is smaller than 0.05 μm.

As can be understood from the above-mentioned results, use of the laminated magnetic film of the thin Fe—M—N magnetic layers and the Pt layers as the metal magnetic film causes orientation of αFe (110) to take place attributable to the diffusion effect of the Pt layers. Thus, the uniformity of the magnetism of the metal magnetic film can be improved and the soft magnetic characteristic can be improved. By making the thickness of the thin Fe—M—N magnetic film to be 0.05 μm to 0.5 μm, the orientation of αFe (110) is enabled to take place easily attributable to the diffusion effect of the Pt layers. Thus, facts can be confirmed that the uniformity of the magnetism of the metal magnetic film is furthermore enhanced and the soft magnetic characteristic is furthermore improved. The foregoing effect can be obtained from the thin Fe—M—N magnetic layer in which the metal portion indicated by the symbol M is another metal element, as well as the thin magnetic films of small crystal particles of Fe—Ta—N.

Example 3

In this example, influences of the average thickness of the Pt layers in the metal magnetic film and the ratio of the overall thickness of the Pt layers with respect to the overall thickness of the metal magnetic film upon the reproduced output of the magnetic head were investigated.

That is, six types of magnetic heads according to the present invention were prepared, which respectively had laminated magnetic films in which the overall thickness of the metal magnetic film was 4 μm, the number of the thin Fe—M—N magnetic layers was 36, and the average thicknesses of Pt layers were 0.3 nm, 1.5 nm, 3 nm, 6 nm, 9 nm and 12 nm. Moreover, another magnetic head was prepared which had only a thin Fe—M—N magnetic layer having a thickness of 4 μm as the metal magnetic film. The reproduced outputs from the above-mentioned magnetic head were measured similarly to Example 2. Note that a thin magnetic films of small crystal particles of Fe—Ta—N was employed in this example as the thin Fe—M—N magnetic layer.

Figure 19:
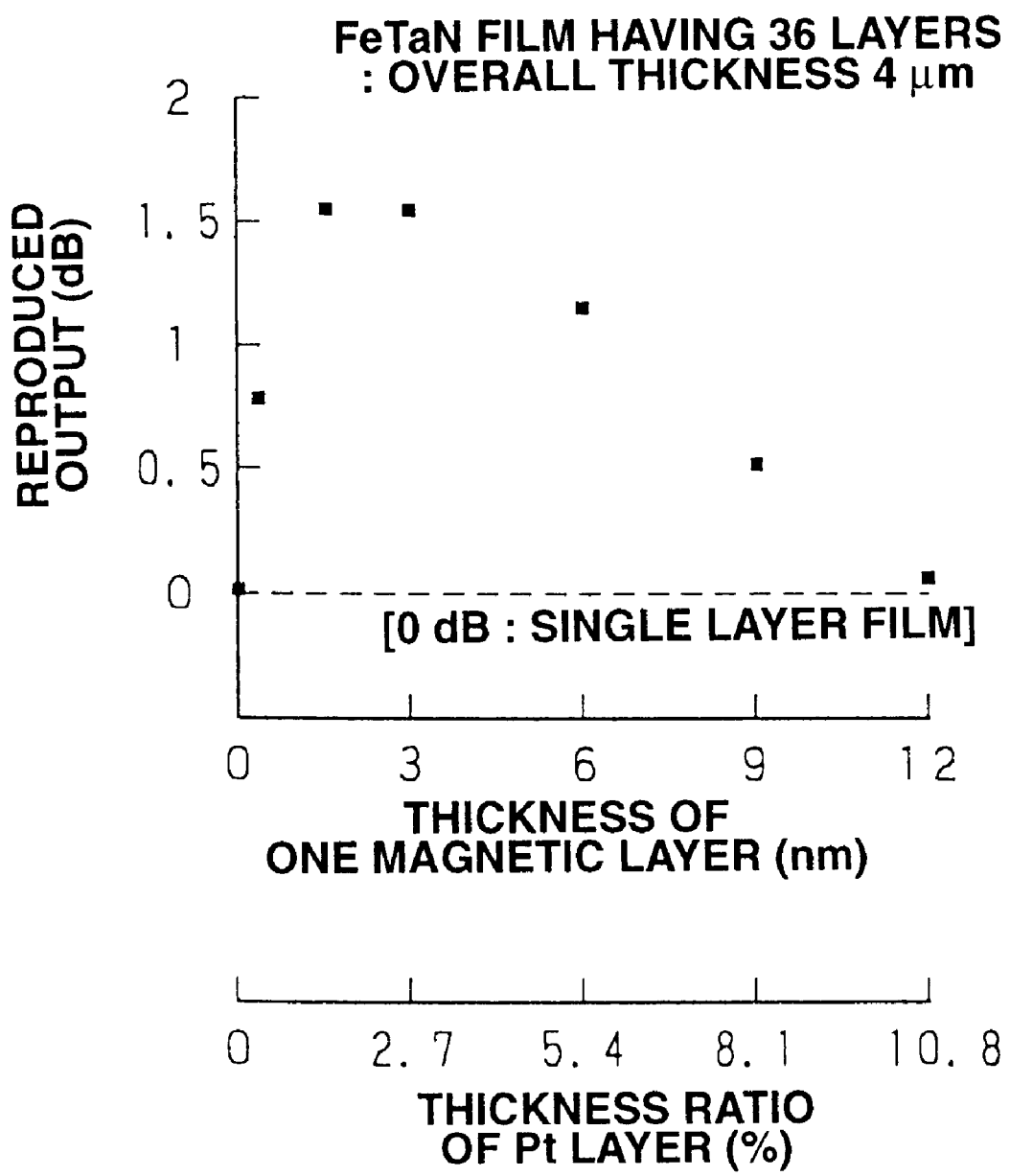
FIG. 19 is a characteristic graph showing average thickness of one Pt layer and the relative outputs.

Results are shown in FIG. 19. FIG. 19 shows the reproduced outputs from the above-mentioned magnetic heads as relative outputs such that the reproduced output of the magnetic head having only the thin Fe—M—N magnetic layer having a thickness of 4 μm as the metal magnetic film was made to be 0 dB. In FIG. 19, the axis of ordinate stands for the relative outputs and the axis of abscissa stands for the average thickness of one Pt layer and the thickness ratio of the Pt layers which is the ratio of the total thickness of the Pt layers in the metal magnetic film with respect to the overall thickness of the metal magnetic film.

As can be understood from FIG. 19, the laminated magnetic film having the Pt layers interposed therein improves the reproduced output. In the case where the average thickness of one Pt layer is 0.3 nm or larger, the reproduced output can furthermore be improved.

However, a fact can be understood that the reproduced output again deteriorates if the average thickness of one Pt layer is larger than 7 nm. In this case, the thickness ratio of the Pt layers, which is the ratio of the total thickness of the Pt layers with respect to the overall thickness of the metal magnetic film, unintentionally exceeds 6%.

As can be understood from the above-mentioned results, such a structure that the thickness of the Pt layers is 0.3 nm to 7 nm causes the orientation of $\alpha$Fe (110) to easily take place. As a result, the uniformity of the magnetism of the metal magnetic film can furthermore be enhanced and the soft magnetic characteristic can furthermore be improved.

Another fact can be understood from the above-mentioned results that a structure, in which the total thickness of the Pt layers in the metal magnetic film is 6% or less of the overall thickness of the metal magnetic film, is expected to satisfactorily prevent the deterioration in the effective saturated magnetic flux density.

The foregoing effects can be obtained from the thin Fe—M—N magnetic layer, in which the metal portion indicated by the symbol M is another metal element, as well as the thin Fe—Ta—N magnetic layer.

As described above, the laminated magnetic film according to the present invention causes metal molecules forming the metal layer to be diffused into the thin magnetic layer. The diffusion effect of the metal molecules results in the small crystal particles of $\alpha$Fe, generated in the thin magnetic layer, having intense crystal orientation. Therefore, the laminated magnetic film is able to have controlled crystal orientation of small crystal particles of $\alpha$Fe by adjusting the metal layer which is laminated together with the thin magnetic layer. Therefore, the above-mentioned laminated magnetic film is able to provide an excellent soft magnetic characteristic in the direction of the thickness thereof.

The method of manufacturing the laminated magnetic film according to the present invention has the steps of laminating the thin magnetic layers and the metal layers and subjecting the laminate to the heat treatment. Therefore, the method according to the present invention is able to precipitate small crystal particles of $\alpha$Fe, the crystal orientation of which is controlled, regardless of the laminating order of the thin magnetic layers and the metal layers. Thus, the method according to the present invention is able to manufacture the laminated magnetic film having an excellent soft magnetic characteristic in the direction of the thickness thereof.

The magnetic head according to the present invention has such a structure that the laminated magnetic film formed by laminating the thin Fe—M—N magnetic layers and the Pt layers is, as the metal magnetic film, formed on the surface of at least one of a pair of the half portions of the magnetic cores on which the magnetic gap is formed. In the process for manufacturing the magnetic head, the heat treatment is performed after the thin Fe—M—N magnetic layer has been performed to form small crystal particles in a non-crystal state. At this time, the ground effect of the Pt layers causes intense $\alpha$Fe (110) orientation to take place in the thin Fe—M—N magnetic layer subjected to the heat treatment. As a result, the uniformity of the magnetism of the metal magnetic film is enhanced and the soft magnetic characteristic can be improved.

Since the magnetic head according to the present invention has such a structure that the metal magnetic film is the laminated magnetic film formed by laminating the thin Fe—M—N magnetic layers and the Pt layers, Fe—Pt compounds are generated in the metal magnetic film and, therefore, magnetically hard portions are generated. Since the above-mentioned portions prevent movement of magnetic domains, the rotating magnetization is enhanced and therefore the permeability in the high frequency regions in the metal magnetic film can be raised.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magnetic head comprising:

a pair of half portions forming a magnetic core and arranged to be joined and integrated with each other such that surfaces of said pair of half portions on which a magnetic gap is formed are abutted against each other, said half portions comprising Mn—Zn ferrite or Ni—Zn ferrite;

each of said surfaces of said pair of half portions having a reaction preventive film layer disposed thereon comprising a metal selected from the group consisting of Pt, Ti, Mo, V, Cr, W, Co and Ni, or a compound selected from the group consisting of $SiO_2$, $Si_3N$ and $Al_2O_3$, said reaction preventive film layer having a thickness of from about 1 nm to about 10 nm; and a laminated metal magnetic film disposed on the reaction preventive film of either or both of said half portions, said laminated metal magnetic film comprising a plurality of magnetic layers alternating with a plurality of metal layers, each said magnetic layer having a thickness of from about 0.05 $\mu$m to about 1 $\mu$m and comprising $Fe_xM_yN_z$, wherein M is selected from Ta, Zr, Hf, Nb, Ti, Mo, Cr or W and x, y and z are atomic percentages such that $71 \leq x \leq 85$, $6 \leq y \leq 15$ and $9 \leq z \leq 16$, each said metal layer having a thickness of from about 0.2 nm to about 10 nm and comprising a metal selected from the group consisting of Rh, Ir, Ag, Pt, Pd and Au, said laminated metal magnetic film having an overall thickness and the ratio of the total thicknesses of said metal layers to said overall thickness being 6% or less of said overall thickness; and a spacer film disposed on said laminated metal magnetic film.

2. A magnetic head as defined in claim 1, wherein said reaction preventive film is Pt.

3. A magnetic head as defined in claim 1, wherein said reaction preventive film is $SiO_2$.

4. A magnetic head as defined in claim 1, wherein each said plurality comprises 36 layers.

5. A magnetic head as defined in claim 1, wherein in the magnetic layers M is Ta.

6. A magnetic head as defined in claim 1, wherein said overall thickness is about 4 $\mu$m.

7. A magnetic head as defined in claim 1, wherein said spacer film comprises $SiO_2$.

8. A magnetic head as defined in claim 1, wherein said spacer film has a thickness of about 100 nm.

* * * * *